(12) United States Patent
Gladden et al.

(10) Patent No.: US 8,813,713 B2
(45) Date of Patent: Aug. 26, 2014

(54) PISTON WITH CYLINDRICAL WALL

(75) Inventors: John R. Gladden, Lafayette, IN (US); Jonathan Kilkenny, Peoria, IL (US); Christopher Batta, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 212 days.

(21) Appl. No.: 13/331,819

(22) Filed: Dec. 20, 2011

(65) Prior Publication Data

US 2012/0160205 A1 Jun. 28, 2012

Related U.S. Application Data

(60) Provisional application No. 61/426,443, filed on Dec. 22, 2010.

(51) Int. Cl.
*F02F 3/00* (2006.01)

(52) U.S. Cl.
USPC .................................................. 123/193.6

(58) Field of Classification Search
USPC .......... 123/193.6, 657, 661, 663, 664; 92/208
See application file for complete search history.

(56) References Cited

U.S. PATENT DOCUMENTS

| 3,930,472 | A | 1/1976 | Athenstaedt |
| 5,337,714 | A | 8/1994 | Tracy |
| 5,868,112 | A | 2/1999 | Mahakul et al. |
| 6,601,561 | B1 | 8/2003 | Liu et al. |
| 7,370,627 | B2 * | 5/2008 | Mahakul et al. ............. 123/276 |
| 7,383,808 | B1 * | 6/2008 | Azevedo et al. ........... 123/193.6 |
| 7,438,039 | B2 * | 10/2008 | Poola et al. ................ 123/193.6 |
| 2006/0096557 | A1 * | 5/2006 | Christain et al. .......... 123/41.38 |
| 2009/0039605 | A1 | 2/2009 | Poola et al. |
| 2009/0250033 | A1 * | 10/2009 | Scharp ....................... 123/193.6 |
| 2010/0101527 | A1 | 4/2010 | Gniesmer |
| 2010/0162986 | A1 | 7/2010 | Grössle et al. |
| 2011/0030645 | A1 * | 2/2011 | Rebello et al. ............. 123/193.6 |
| 2011/0100317 | A1 * | 5/2011 | He et al. .................... 123/193.6 |
| 2011/0253096 | A1 * | 10/2011 | Easley et al. ................. 123/294 |
| 2013/0032120 | A1 * | 2/2013 | Claver et al. ............... 123/193.6 |
| 2013/0047948 | A1 * | 2/2013 | Heuschmann ............. 123/193.6 |

FOREIGN PATENT DOCUMENTS

| FR | 988995 | 9/1951 |
| FR | 2246742 | 5/1975 |
| GB | 2200718 A | 8/1988 |
| GB | 2205923 A | 12/1988 |
| GB | 2250700 A | 6/1992 |
| GB | 2268568 A | 12/1994 |
| GB | 2394990 A | 5/2004 |
| JP | 61-089964 A | 5/1986 |
| JP | 61-155617 A | 7/1986 |

(Continued)

*Primary Examiner* — M. McMahon
(74) *Attorney, Agent, or Firm* — Leydig, Voit & Mayer, Ltd.

(57) ABSTRACT

The piston has a crown forming a piston bowl. The piston bowl has a center portion with a convex spherical shape, a floor having a convex frusto-conical shape adjacent the center portion, and a base having a concave toroidal shape surrounding the floor. The piston bowl also has a cylindrical wall extending tangentially from the base that surrounds the center portion. The piston has a top surface perpendicular to the cylindrical wall along a rim of the piston bowl. A ratio between the piston bowl depth and the cylindrical wall length is less than 4, and a ratio between the piston bowl diameter and the piston bowl depth is 4.7.

20 Claims, 1 Drawing Sheet

(56) References Cited

FOREIGN PATENT DOCUMENTS

| | | |
|---|---|---|
| JP | 06-010673 A | 1/1994 |
| JP | 08-338303 A | 12/1996 |
| JP | 2000-220520 A | 8/2000 |
| JP | 2001-082150 A | 3/2001 |
| JP | 2002-349267 A | 12/2002 |
| JP | 2004-536992 A | 12/2004 |
| JP | 2010-048260 A | 3/2010 |
| JP | 2010-248957 A | 11/2010 |
| WO | 85/00197 A1 | 1/1985 |
| WO | 87/07678 A1 | 12/1987 |
| WO | 90/04713 A1 | 5/1990 |
| WO | 90/14515 A1 | 11/1990 |
| WO | 2008/082330 A1 | 7/2008 |

* cited by examiner

PISTON WITH CYLINDRICAL WALL

TECHNICAL FIELD

This patent disclosure relates generally to internal combustion engines and, more particularly, to pistons for use in internal combustion engines.

BACKGROUND

When engines run, they expel soot and other pollutants in the form of exhaust. It is generally desirable to keep engine emissions low, resulting in cleaner running engines. Changing any one of a variety of engine design and operating variables, such as engine compression, combustion chamber shape, fuel injection spray pattern, and other variables can affect emissions. Adjusting the shape of a combustion chamber can help reduce engine emissions during operation.

SUMMARY

The disclosure describes, in one aspect, a piston having a crown and a crown diameter. The piston has a piston bowl formed in the crown having a center portion. The center portion has a generally convex spherical shape with a radius originating from a piston central axis. The piston bowl also has a floor having a generally convex frusto-conical shape. The floor is symmetrical about the piston central axis and adjacent the center portion. The piston bowl also has a base with a generally concave toroidal shape surrounding the floor, and a cylindrical wall having a length along the piston central axis. The cylindrical wall tangentially extends from the base and surrounds at least a portion of the center portion. The cylindrical wall defines a diameter of the piston bowl. The piston also has a top surface with a flat, annular shape that is perpendicular to the cylindrical wall and along a rim of the piston bowl. The piston bowl has a depth defined between the top surface and a bottom edge portion. The bottom edge portion is between the base and the floor along the piston central axis. The ratio between the depth of the piston bowl and the length of the cylindrical wall is less than 4, and the ratio between the diameter of the piston bowl and the depth is at most 4.7.

DETAILED DESCRIPTION

This disclosure relates to a piston 100 with a crown 101 for use in an internal combustion engine. The engine has fuel injectors for introducing plumes of fuel into combustion chambers each of which is formed at least in part by a piston bowl 102. The disclosed piston 100 with piston bowl 102 improves soot oxidation, positively affects the flow field in-cylinder, and results in higher oxygen entrainment during a late combustion stage by increasing mixing energy between fuel and air in the combustion chamber.

Figure 1:
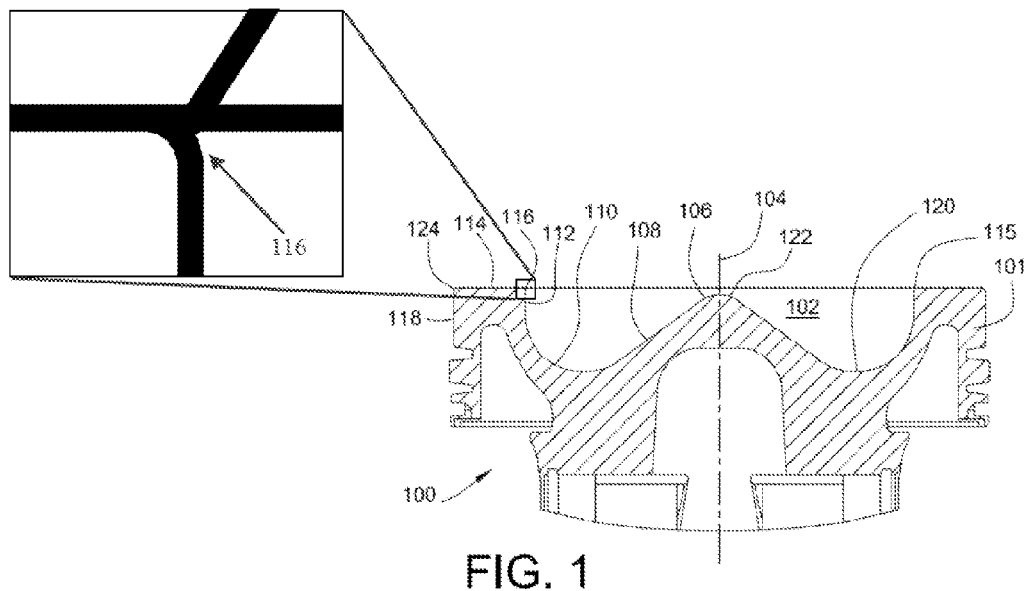
FIG. 1 is a cross-sectional view of a piston in accordance with the disclosure.

As shown in FIG. 1, the piston bowl 102 is an upward-facing cavity formed within the piston crown 101. Both the piston crown 101 and the piston bowl 102 have a circular shape and are symmetrical about a piston central axis 104. The piston bowl 102 is formed in the piston crown 101 and has several features that enhance fuel and air mixing. One such feature is a center portion 106 that has a generally spherical shape and an apex 122 facing upwards, in the orientation shown in the figures, towards the top of the piston bowl 102. The sphere that forms the center portion 106 has a radius R1 that originates on the piston central axis 104. Another feature forming the piston bowl 102 is a floor 108 that has a generally convex frusto-conical shape. The floor 108 is adjacent to the center portion 106 and is connected to the center portion 106 by a generally tangential transition that provides an uninterrupted surface. The frusto-conical floor 108 surrounds the center and is symmetrical about the piston central axis 104. The floor 108 slopes downward away from the center portion 106 and has a generally tangential transition to a base 110. The base 110 has a generally concave toroidal shape and surrounds the floor 108, curving with a constant base radius R2 away from the piston central axis 104.

The outer edge of the base 110 forms another generally tangential transition, a portion of which defines a cylindrical wall 112. The cylindrical wall 112 extends upward, away from the base 110. The cylindrical wall 112 has a length L as measured along the piston central axis 104, and surrounds at least a portion of the center portion 106. The center portion 106, floor 108, base 110, and cylindrical wall 112 have smooth, tangential transitions from one surface to the next, forming the smooth surface of the piston bowl 102.

Figure 2:
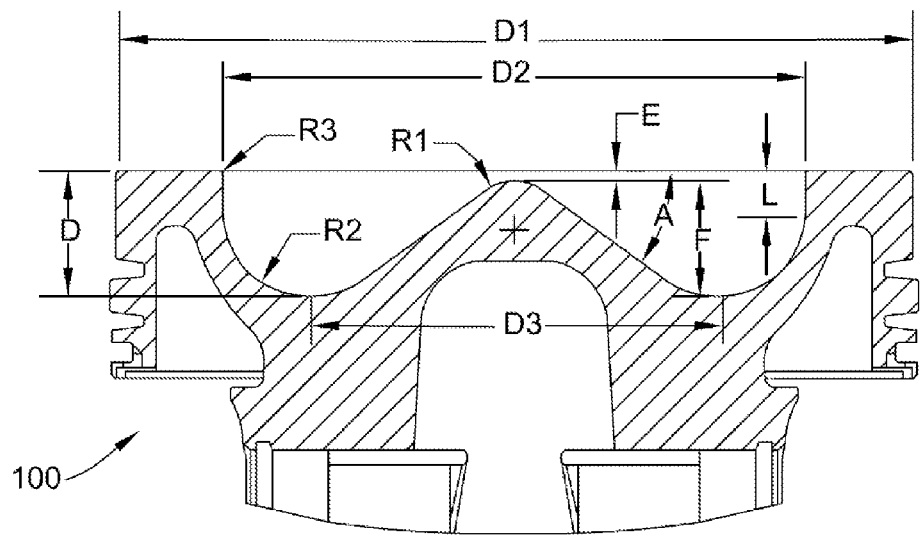
FIG. 2 is a cross-sectional view of the piston of FIG. 1 indicating dimensions of the piston.

The piston crown 101 also has a top surface 114 with a flat, annular shape. The top surface 114 is perpendicular to and extends around the cylindrical wall 112. The cylinder wall 112 meets the top surface 114 along a rim 115 of the piston bowl 102. The rim 115 has a chamfer 116 with a chamfer radius R3 that extends tangentially to both the cylindrical wall 112 and the top surface 114. The outermost edge of the top surface 114 transitions smoothly via an outer rim 124 to an outer piston wall 118. The outer piston wall 118 forms a cylindrical surface concentric with the cylindrical wall 112. The diameter of the outer piston wall 118 defines the diameter D1 of the piston crown 101 as shown in FIG. 2.

Various geometrical parameters of the piston crown 101 and piston bowl 102 influence the performance of the engine's combustion chamber. As best shown in FIG. 2, one such parameter is the diameter D2 of the piston bowl 102. The piston bowl 102 diameter D2 is defined as the diameter of the cylindrical wall 112. The piston bowl 102 depth D is defined between the top surface 114 and a bottom edge portion 120 of the base 110 along the piston central axis 104. The bottom edge portion 120 is the lowest point on the base 110 and forms a circle around the piston central axis 104. Other piston crown 101 parameters are the floor angle A between the plane parallel to the top surface 114 and the floor 108, the apex clearance E defined between the apex 122 of the center portion 106 and the top surface along the piston central axis 104, the apex height F defined between the apex of the center portion and the bottom edge portion 120 along the piston central axis, and the diameter D3 of the circle formed by the bottom edge portion 120. The sphere forming the center portion 106 has a radius R1 and the curve forming the base 110 has a base radius R2.

The following ratios define certain parameters of the piston 100:

(a) The ratio D/L is less than 4.
(b) The ratio D1/D2 is at least 1.39.
(c) The ratio D2/D is at most 4.7.
(d) The ratio D1/D3 is at least approximately 2.0.
(e) The ratio D2/D3 is at least approximately 1.4.
(f) The ratio D1/R1 is approximately 17.
(g) The ratio D2/R1 is approximately 12.2.

(h) The ratio D1/R2 is approximately 9.3.
(i) The ratio D2/R2 is approximately 6.7.
(j) The ratio D1/R3 is approximately 130.8.
(k) The ratio D2/R3 is approximately 93.8.
(l) The ratio D1/E is at most approximately 85.
(m) The ratio D2/E is at most approximately 61.
(n) The ratio D1/L is approximately 21.0.
(o) The ratio D2/L is approximately 15.1.

Piston 100 dimensions conforming to these ratios provide particular advantages. Specifically, the diameter D2 of the piston bowl 102 impacts the piston bowl volume and, thus, constrains other dimensions given a target compression ratio. A smaller diameter allows the piston bowl 102 to have a greater depth D for the same target compression ratio. The disclosed ratio D1/D2 between the piston crown 101 diameter D1 and the piston bowl 102 diameter D2 provides improved particulate tradeoffs. The disclosed chamfer 116 radius R3 and ratios thereof increases fuel/air mixing and changes the flow field in the combustion chamber, which results in improved soot oxidation. The disclosed length L of the cylindrical wall 112 and the ratios thereof also positively affect the flow field in an engine combustion chamber and result in higher oxygen entrainment late in combustion by increasing mixing energy. The disclosed apex clearance E between the center portion 106 apex 122 and the top surface 114 and the ratios thereof allow a higher center portion than in prior designs, which allows for a deeper piston bowl 102 depth D and steeper floor angle A. Additionally, the ratio D2/D between the piston bowl 102 diameter D2 and the piston bowl depth D allows for a deeper piston bowl while maintaining a consistent compression ratio. These piston 100 features result in a cleaner burning engine as less particulate escapes into the atmosphere, reducing pollutant emission. For example, the disclosed chamfer 116 radius R3 of 1.3 listed below improves particulate emissions by approximately 15%.

The following table includes specific values for the parameters defined above for one embodiment of the disclosure. Other values for these parameters may be used consistent with the present disclosure.

| | |
|---|---|
| D1 | 170 mm |
| D2 | 122 mm |
| D3 | 85.4 mm |
| R1 | 10 mm |
| R2 | 18.3 mm |
| R3 | 1.3 mm |
| A | 36° |
| D | 26.35 mm |
| E | 2 mm |
| F | 24.3 mm |
| L | 8.1 mm |

Industrial Applicability

The industrial application of the piston with a cylindrical wall as described herein should be readily appreciated from the foregoing discussion. The present disclosure is applicable to any machine powered by a combustion engine. It is particularly useful in machines powered by large bore diesel engines. There is continued pressure to build engines that burn fuel more cleanly and efficiently, but still offer the performance desired to operate a particular machine.

The present disclosure, therefore, is applicable to many different machines and environments. One exemplary use of the piston in this disclosure is in machines regulated under particular emissions standards. The Environmental Protection Agency of the United States has introduced increasingly stringent emissions standards for diesel engines. The piston in this disclosure is at least suitable for a large diesel engine to meet Tier 4i emissions standards.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A piston having a crown and a crown diameter, the piston comprising:
 a piston bowl formed in the crown, the piston bowl comprising:
  a center portion having a generally convex spherical shape with a radius originating from a piston central axis, the center portion including an apex;
  a floor having a generally convex frusto-conical shape disposed symmetrically around the piston central axis adjacent the center portion;
  a base having a generally concave toroidal shape surrounding the floor; and
  a cylindrical wall having a length along the piston central axis, the cylindrical wall tangentially extending from the base and surrounding at least a portion of the center portion and defining a piston bowl diameter;
 a top surface having a flat annular shape disposed perpendicularly around the cylindrical wall along a rim of the piston bowl, an apex clearance being defined between the apex and the top surface along the piston central axis;
 wherein the piston bowl has a depth defined between the top surface and a bottom edge portion disposed between the base and the floor along the piston central axis;
 wherein a ratio between the depth of the piston bowl and the length of the cylindrical wall is less than 4;
 wherein a ratio between the diameter of the piston bowl and the depth is at most 4.7;
 wherein a ratio between the crown diameter and the apex clearance is approximately 85; and
 wherein a ratio between the piston bowl diameter and the apex clearance is approximately 61.

2. The piston of claim 1 wherein a ratio between the crown diameter and the piston bowl diameter is at least 1.39.

3. The piston of claim 1 further comprising a chamfer tangential to both the cylindrical wall and the top surface.

4. The piston of claim 3 wherein the chamfer has a chamfer radius, and wherein a ratio between the crown diameter and the chamfer radius is approximately 130.8.

5. The piston of claim 3 wherein the chamfer has a chamfer radius, and wherein a ratio between the piston bowl diameter and the chamfer radius is approximately 93.8.

6. The piston of claim 1 wherein the bottom edge portion forms a circle around the piston central axis, and wherein a ratio between the crown diameter and the circle diameter is approximately 2.0.

7. The piston of claim 1 wherein the bottom edge portion forms a circle around the piston central axis, and wherein a ratio between the piston bowl diameter and the circle diameter is approximately 1.4.

8. The piston of claim 1 wherein a ratio between the crown diameter and the radius of the center portion is approximately 17.

9. The piston of claim 1 wherein a ratio between the piston bowl diameter and the radius of the center portion is approximately 12.2.

10. The piston of claim 1 wherein the base has a base radius, and wherein a ratio between the crown diameter and the base radius is approximately 9.3.

11. The piston of claim 1 wherein the base has a base radius, and wherein a ratio between the piston bowl diameter and the base radius is approximately 6.7.

12. The piston of claim 1 wherein a ratio between the crown diameter and the length of the cylindrical wall is approximately 21.0.

13. The piston of claim 1 wherein a ratio between the piston bowl diameter and the length of the cylindrical wall is approximately 15.1.

14. The piston of claim 1 wherein the crown diameter is approximately 170 mm.

15. The piston of claim 1 wherein the piston bowl diameter is approximately 122 mm.

16. The piston of claim 1 wherein the depth of the piston bowl is approximately 26.35 mm.

17. The piston of claim 1 wherein the length of the cylindrical wall is approximately 8.1 mm.

18. The piston of claim 3 wherein the chamfer has a chamfer radius of approximately 1.3 mm.

19. A piston having a crown and a crown diameter, the piston comprising:
   a piston bowl formed in the crown, the piston bowl comprising:
      a center portion having a generally convex spherical shape with a radius originating from a piston central axis, the center portion including an apex;
      a floor having a generally convex frusto-conical shape disposed symmetrically around the piston central axis adjacent the center portion;
      a base having a generally concave toroidal shape surrounding the floor; and
      a cylindrical wall having a length along the piston central axis, the cylindrical wall tangentially extending from the base and surrounding at least a portion of the center portion;
   a top surface having a flat annular shape disposed perpendicularly around the cylindrical wall along a rim of the piston bowl, an apex clearance being defined between the apex and the top surface along the piston central axis;
   wherein the piston bowl has a depth defined between the top surface and a bottom edge portion disposed between the base and the floor along the piston central axis;
   wherein a ratio between the depth of the piston bowl and the length of the cylindrical wall is less than 4;
   wherein a ratio between the diameter of the piston bowl and the depth is at most 4.7;
   wherein a ratio between the crown diameter and the apex clearance is approximately 85.

20. A piston having a crown and a crown diameter, the piston comprising:
   a piston bowl formed in the crown, the piston bowl comprising:
      a center portion having a generally convex spherical shape with a radius originating from a piston central axis, the center portion including an apex;
      a floor having a generally convex frusto-conical shape disposed symmetrically around the piston central axis adjacent the center portion;
      a base having a generally concave toroidal shape surrounding the floor; and
      a cylindrical wall having a length along the piston central axis, the cylindrical wall tangentially extending from the base and surrounding at least a portion of the center portion and defining a piston bowl diameter;
   a top surface having a flat annular shape disposed perpendicularly around the cylindrical wall along a rim of the piston bowl, an apex clearance being defined between the apex and the top surface along the piston central axis;
   wherein the piston bowl has a depth defined between the top surface and a bottom edge portion disposed between the base and the floor along the piston central axis;
   wherein a ratio between the depth of the piston bowl and the length of the cylindrical wall is less than 4;
   wherein a ratio between the diameter of the piston bowl and the depth is at most 4.7;
   wherein a ratio between the piston bowl diameter and the apex clearance is approximately 61.

* * * * *

UNITED STATES PATENT AND TRADEMARK OFFICE
CERTIFICATE OF CORRECTION

| | | |
|---|---|---|
| PATENT NO. | : 8,813,713 B2 | Page 1 of 1 |
| APPLICATION NO. | : 13/331819 | |
| DATED | : August 26, 2014 | |
| INVENTOR(S) | : Gladden et al. | |

It is certified that error appears in the above-identified patent and that said Letters Patent is hereby corrected as shown below:

In the Specification

Column 3, line 53, delete "Industrial Applicability" and insert -- INDUSTRIAL APPLICABILITY --.

Signed and Sealed this
Fifteenth Day of September, 2015

Michelle K. Lee
*Director of the United States Patent and Trademark Office*